March 26, 1957     W. W. COWSERT     2,786,655
DRIVE MECHANISM FOR FEED MIXERS

Filed March 4, 1955     2 Sheets-Sheet 1

INVENTOR.
William W. Cowsert
BY Scott L. Norvict
Atty.

March 26, 1957  W. W. COWSERT  2,786,655
DRIVE MECHANISM FOR FEED MIXERS
Filed March 4, 1955  2 Sheets-Sheet 2

INVENTOR.
William W. Cowsert
BY
Scott L. Norvich
Atty.

United States Patent Office 2,786,655
Patented Mar. 26, 1957

2,786,655

DRIVE MECHANISM FOR FEED MIXERS

William W. Cowsert, Laveen, Ariz.

Application March 4, 1955, Serial No. 492,231

4 Claims. (Cl. 259—41)

This invention concerns improvements in drives for feed mixers of the type wherein a wheeled mixing bin on a trailer body is towed behind a tractor having a power take-off shaft.

One of the objects of this invention is to provide a drive which will operate within the confines of the frame of the mixer body and will transmit rotary movement from a shaft attachable to the power take-off shaft on the tractor and deliver rotary movement of the proper speed and power to the various movements of the mixer.

Another object is to provide a mechanical mechanism which will transmit rotary motion from the power take-off shaft of a tractor attached to the front of a mixer trailer body and divide and distribute the power to the various belts and beaters within the mixer at the correct speed and with sufficient power to insure their proper action; feed mechanism being contained for the most part within the front portion of the frame of the mixer trailer body and the upper fifth wheel structure.

A third object is to provide mechanism for driving of portable mixer elements, as above described, which is confined within the lower frame structure of the mixer providing a minimum of mechanism exposed on the outside of the mixer body.

Other objects will appear hereinafter.

I attain the foregoing objects by means of the devices, structure and combinations of parts shown in the accompanying drawings in which—

Similar numerals refer to similar parts in the several views.

Figure 1:
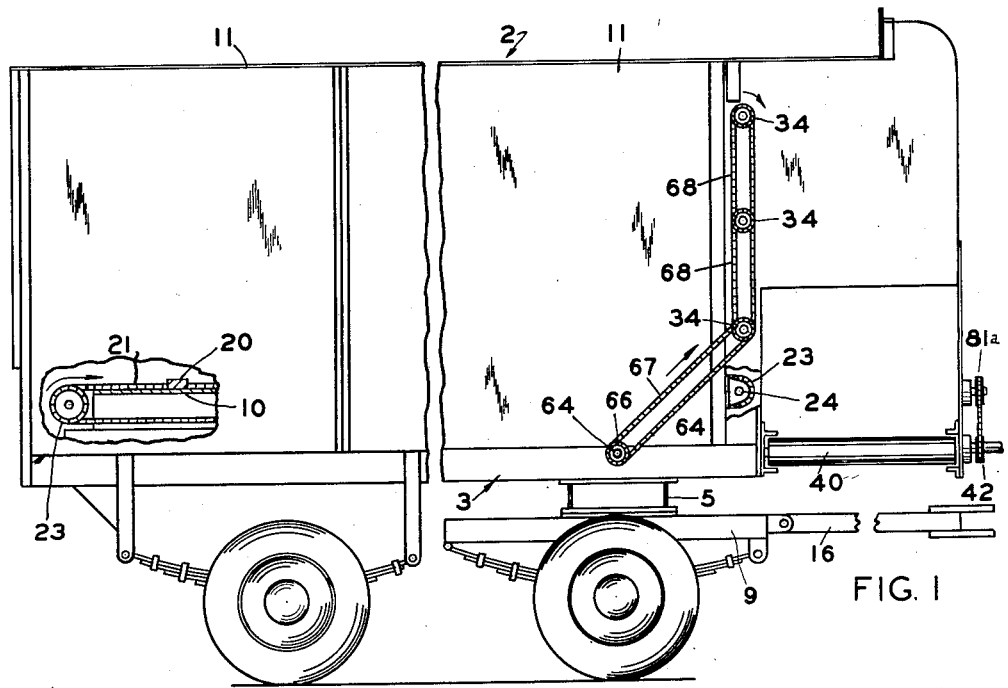
Figure 1 is a side view of a portable trailer feed mixer incorporating my improvements.
Figure 2:
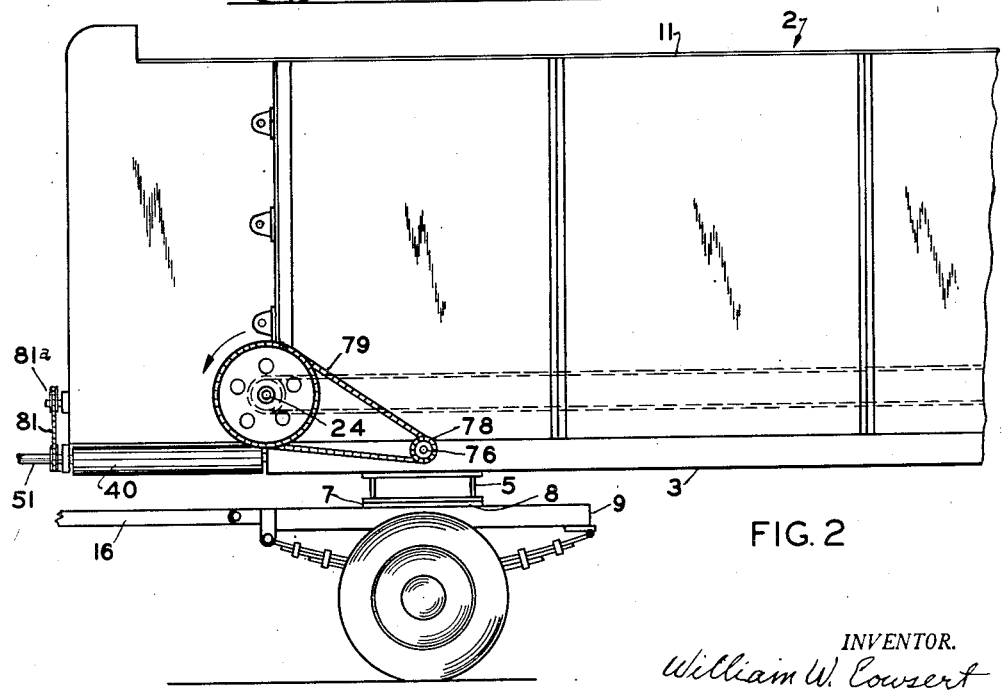
Figure 2 is a partial side elevation of the mixer taken from the opposite side of the mixer body.
Figure 3:
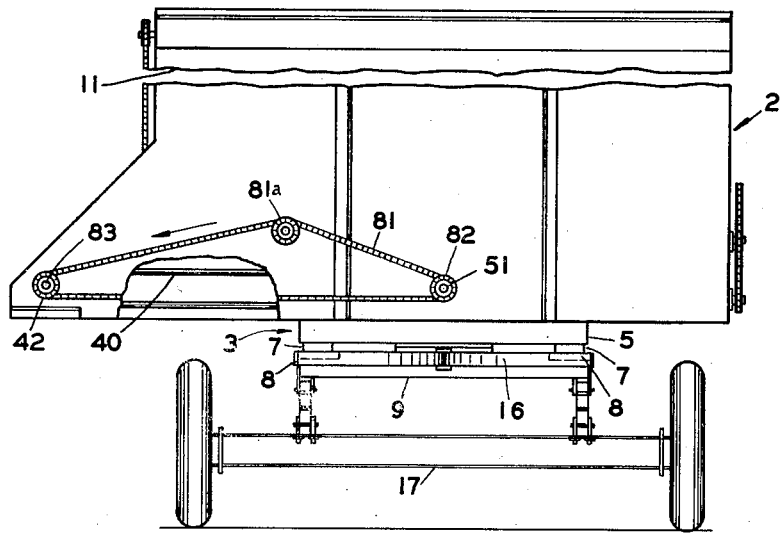
Figure 3 is a plan view of the front portion of the mixer frame showing the location of the drive mechanism within the frame, certain parts being broken away to show the interior structure.
Figure 4:
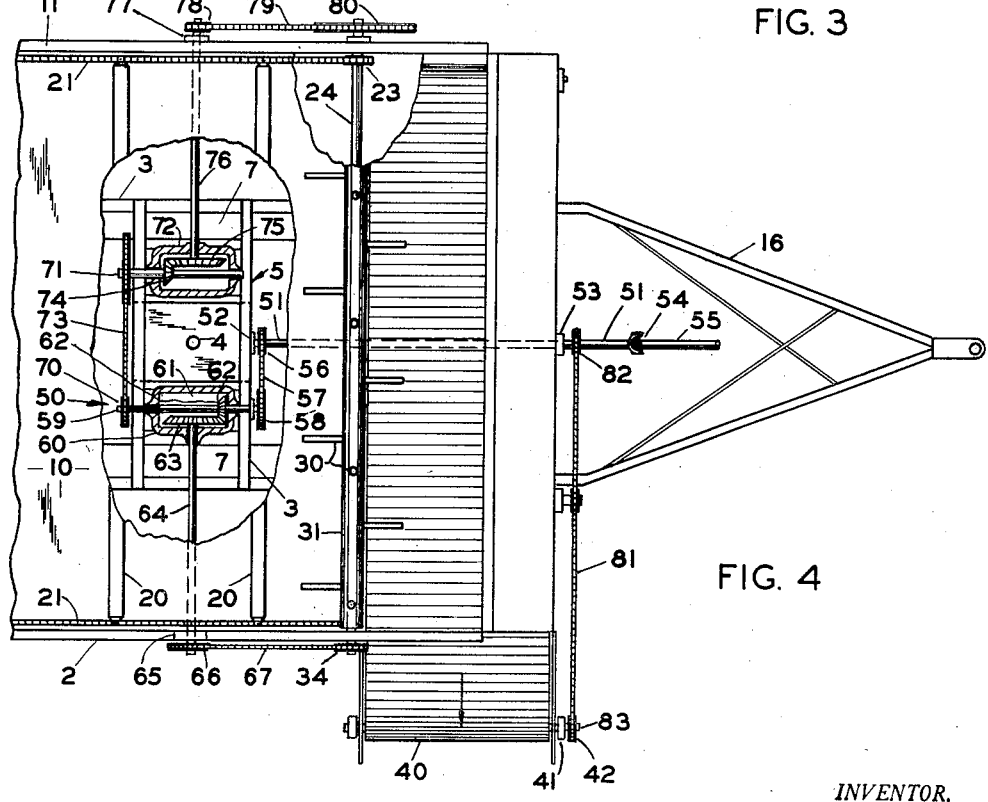
Figure 4 is a plan view of the forward portion of the mixer with certain portions of the body broken away to show construction therebelow.

The body of the mixer is indicated by numeral 2, and the subframe, in general, by numeral 3. The front portion of the subframe includes an upper fifth wheel frame 5 which is rectangular in shape, made of lengths of channel steel and includes a plate positioned in the lower part of the central portion which holds the king pin 4. There are also slide plates 7 on the bottom of the fifth wheel frame 5 which contact slide plates 8 on the upper face of the lower fifth wheel frame 9.

A V shaped composite draw bar 16 is attached to the front axle 17 which in turn is attached to the lower fifth wheel frame. The entire trailer structure is pulled by means of this draw bar. The front end of the draw bar is attached to the usual and conventional swivel pin (not shown) on the rear of a tractor.

As is well known to those familiar with the art of portable feed mixers the mechanism of the mixer includes floor slide bars 20 running on laterally disposed chains 21 which are supported on sprockets 23 at each end. The shaft 24 supporting the front sprockets is driven at a comparatively slow speed by the power mechanism hereinafter described.

As feed is moved forward in the body of the mixer by bars 20 running over the floor 10 of the bin 11 it is beaten and mixed by fingers 30 on transverse shafts 31 which extend across the forward end portion of the mixer bin 11. These shafts are driven at a comparatively fast speed by sprockets 34 at one of their ends by the mechanism hereinafter described.

In addition to the foregoing the mixed feed is conveyed and delivered to one side of the mixer bin by a transverse feed belt 40 which runs over rollers 41 at each end and these are driven by sprocket 42, also driven by the mechanism hereinafter described.

The driving mechanism, which is the subject matter of this invention, is indicated generally by numeral 50. This includes a longitudinally extending shaft 51 centrally disposed above the upper fifth wheel frame 5 and supported on suitable bearings 52 and 53. The forward end of this shaft is provided with a universal joint 54 which connects to an extensible splined drive shaft 55 which has mechanism at its front end for connecting to the power take-off shaft of the tractor attached to draw bar 16. At the rear end of this shaft there is a small driving sprocket 56 which carries a chain 57 running over a larger driven sprocket 58. This driven sprocket is keyed to a longitudinally extending driven shaft 59 which is laterally disposed relative to the central shaft above mentioned and runs through and is journalled in an oil tight gear box 60 which contains right angle bevel gears 61. A small bevel gear 62 is keyed to driven shaft 59 and, within the box, drives a larger gear 63 journalled on a shaft 64 extending transversely of the trailer body. Shaft 64 extends outward from the upper fifth wheel frame and extends just to a bearing 65 on the right hand side of the trailer frame member. A sprocket 66 is keyed on the end of this shaft and drives the transverse beater shafts 31 through chains 67 and 68.

A second sprocket 70 on the driven shaft 59 drives a longitudinally extending shaft 71 journalled in a laterally disposed oil tight gear box 72 by chain 73 attached to the left hand portion of the upper fifth wheel frame. This gear box contains a small driving gear 74 which meshes with driven gear 75 on transverse shaft 76 which extends to the left frame member of the bin body where it is journalled in a self aligning bearing 77. A small sprocket 78 on its outer end drives the floor feed bars 20 forward by means of chain 79 and large sprocket 80 on shaft 24.

The central driving shaft 51 is also provided with a small driving sprocket 82 which drives the shaft 83 on a roller 41 over which the feed delivery belt 40 runs.

It is to be understood that the relationship between the various sprockets and shafts is such that speed is reduced and power increased in all parts where necessary and desired and that the torsional load transmitted is divided by the two gear boxes 60 and 72. Thus, for example, the load on the feeding chains 21, which is very heavy, is handled by speed reduction and power increase through the left hand gear box 72 while the loads transmitted to the beaters and mixers are transmitted through the right hand gear box 60. In this way no one gear box transmits the whole of the power required. Also, the gear boxes are placed within the rectangular frame of the upper fifth wheel so that they may be securely attached to the frame members of the upper fifth wheel. They are protected by the frame of the fifth wheel and are securely anchored so that power factors and moments of force, caused by the transmission of torque at right angles through the box, are adequately secured by the rigidity of the fifth wheel frame and the trailer subframe.

The ratios between the several sprockets and gears are as follows so that the speeds of the various driven elements of the mixer are obtained.

Assuming the power-take-off shaft to have a speed of 300 revolutions per minute then the first take-off, which is to the mixed feed delivery belt 40, is through sprockets having a 12 to 16 ratio, which gives the roller shaft for this belt a speed of 225 R. P. M.

The next take-off is the drive to the longitudinal shaft in right hand gear box 60. The speed from the drive shaft to the longitudinal gear box shaft is reduced by sprockets on which chain 57 runs by a ratio of 12 to 36, thus giving the gear box shaft a speed of 100 R. P. M.

The function of the gear box is not only to reduce speed further but also to change the direction of the driven shaft, therefore, the transverse driven shaft 64 from this gear box will operate at a speed of 50 R. P. M. This shaft extends to the right hand side of the bin and drives the mixer shafts 31 through chain 67. The ratio of the sprockets operating between shaft 64 and the mixer shafts is 36 to 12, therefore, the mixer shafts 31 operate at the speed of 150 R. P. M.

From shaft 59 in gear box 60 power is transmitted by a chain and sprockets having a ratio of 12 to 48, thus turning longitudinal shaft 71 in the left hand gear box at a speed of 25 R. P. M. The transverse driven shaft 76 in this gear box extends to the left side of the bin and drives the bed scraper shaft 24 at a speed of 2½ R. P. M. by reduction based on the ratio of 12 to 60. This high reduction in speed gives sufficient power to the chains and sprockets that drive the scraper bars 20 so that they will move under the load to be mixed and force it forward toward the rotary mixers. It is to be noted that these mixers must be rotated fast enough to attack, break up and mix the entire depth of the feed in bin 2 as it moves forward. The speed of the transverse delivery belt 40 must be such that the mixed feed is moved from the front part of the bin as fast as it is delivered from the beaters and mixer, therefore, shaft 42 is driven at the speed above mentioned, which approximates that of the power take-off shaft.

From the foregoing it will be seen that whereas the driving shaft 51 is longitudinal and is in the middle of the trailer body the power is transmitted transversely to each side of the body by enclosed gearing centrally positioned in the body frame. Sprockets and chains on the sides of the body are therefore needed only to secure the desired speed for the shafts to be driven. These sprockets and chains, driving the several shafts, do not protrude any appreciable distance beyond the sides of the bin and are, therefore, unlikely to be harmed by contact with objects near which the trailer may be drawn. On the other hand they are always available for cleaning, oiling and adjustment. Adjustment of the fast moving chain 81 driving the feed delivery belt is had by an idler sprocket 81a.

When the tongue 16 is attached to a tractor of suitable size and strength and the driving power take-off shaft attached to the tractor mechanism and driven at the speed indicated all parts of the mixer operate continuously and at proper speeds to effect complete operation. That is, as the trailer is drawn forward the load in the bin moves forward, is broken up, beaten and mixed by the beaters and then delivered by belt 40 so that the trailer may be drawn along long cattle feeding troughs and automatically fills them with mixed feed as desired.

As is understood in the art the various feeds needed are first loaded into the bin in such layers as may be convenient when taken from storage bins. After the various feeds have been placed in the bin of the trailer it is only necessary to draw the trailer along the feed troughs and operate the drive shaft as above stated.

The improvments herein disclosed concern improved mechanism for driving the several parts of the mixing and delivery mechanism as above specified in detail. The several elements of the drive are simple and adequately sturdy for rough farm use. Replacement and lubrication of the several chains are easy because they operate in the open and are easily accessible. On the other hand, the gears are enclosed to protect them from the dirt and to maintain lubrication. Since the gear boxes are separate, repair of either set of gears may be had by replacement of the entire gear box. Replacement of an entire large set of gears is, therefore, unnecessary. Furthermore, the use of two gear boxes and connecting chains permits use of simple bevel gears of comparatively small size. Considering the limited space beneath the bin and within the fifth wheel frame, and the amount of rotational reduction, the two gear units are more efficient for farm use, take up less space, and are more dependable than complex all-gear units including large driven gears or worm and sector speed reduction units.

I claim:

1. In a portable feed mixer and distributor adapted to be drawn and operated by a tractor having a power take-off shaft, having a wheeled frame, a bin on said frame, an underframe carrying a fifth wheel, having an upper part including a rectangular frame on said mixer frame and a lower part provided with a draw bar extending in front of said mixer frame, means for moving a load of feed forward in said bin including transverse scrapers moving over the floor of said bin supported by laterally disposed chains running over sprockets on a transverse feed chain shaft, feed mixers on transverse shafts operating in the forward part of said bin, and a transversely operating mixed feed moving and delivery belt at the front of said bin driven by a roller supported on a longitudinally extending shaft, mechanism for transmitting rotary motion from the power take-off shaft on said tractor attached to said under frame draw bar and transmitting it to the shafts of said mixing and said moving mechanisms, consisting of a longitudinally extending main shaft centrally disposed in said mixer frame having means for connecting to a power take-off mechanism of said tractor at its front end, a first gear box laterally disposed within one side portion of the upper part of said under frame, a second gear box disposed in the opposite side portion of the upper part of said under frame, each of said gear boxes having cooperating small and large bevel gears, sprocket and chain mechanism at the rear end of said main shaft driving the small bevel gear supported on a longitudinal shaft on said first gear box, the large bevel gear of said first gear box driving a transverse shaft connected through sprocket and chain mechanism to said feed mixer shafts at increased speed relative to said main shaft mixing feeds as they are moved forward in said bin by said transverse scrapers, a longitudinal shaft supporting the small bevel gear in said second gear box driven at reduced speed by sprocket and chain mechanism from the longitudinal shaft in said first gear box at reduced speed, a transverse shaft driven at reduced speed by the large bevel gear in said second gear box driving the shaft carrying the feed scraper chain sprockets at reduced speed, and a sprocket intermediately disposed on said main drive shaft driving the shaft on which the roller driving said delivery belt is supported by chain and sprocket means.

2. In a portable feed mixer and distributor adapted to be drawn and operated by a tractor having a power take-off shaft, having a wheeled frame, a bin on said frame, a frame carrying a fifth wheel having an upper part including a rectangular frame on said mixer frame and a lower part provided with a draw bar extending in front of said mixer frame, means for moving a load of feed forward in said bin including transverse scrapers moving over the floor of said bin supported by laterally disposed chains running over sprockets on a transverse feed chain shaft, feed mixers on transverse shafts operating in the forward part of said bin, and a transversely operating mixed feed moving and delivery belt at the front of said bin driven by a roller supported on a longitudinally extending shaft, mechanism for transmitting rotary motion from the power take-off shaft on said tractor attached to said frame carrying said fifth wheel draw bar and transmitting it to the shafts of said mixing and said moving mechanisms, consisting of a longitudinally extending main shaft centrally disposed in said mixer frame having means for connecting to a power take-off mechanism of said tractor at its front end, and having a sprocket at its rear end, a first gear box laterally disposed within one side of said frame carrying said fifth wheel upper part having a longitudinal shaft with a sprocket at its front end driven by a chain from said sprocket on said main shaft, a small bevel gear keyed on said shaft within said box and a sprocket at its rear end, and a transverse shaft, having a large bevel gear at its inner end keyed on to said transverse shaft within said box and meshing with said small bevel gear, extending laterally outward from said frame and having a sprocket at its outer end driving said mixer shafts through chain and sprocket means, a second gear box laterally disposed within the opposite side of said frame carrying said fifth wheel upper part having a longitudinal shaft driven by sprocket and chain means from the longitudinal shaft of said first gear box, having a small sprocket keyed on within said box, and a transverse shaft having a large bevel gear at its inner end meshing with said small bevel gear and extending laterally outward and having a sprocket at its outer end driving the shaft carrying the sprockets over which the chains carrying said scrapers run, and a sprocket keyed to the front end of said main shaft driving said shaft carrying said delivery belt supporting roller.

3. In a portable feed mixer and distributor, adapted to be drawn and operated by a tractor having a power take-off shaft, including a wheeled frame, a bin on said frame, an under frame carrying a fifth wheel having an upper part attached to the under side of said frame and a pivoting lower part provided with a draw bar extending forward of said frame and attached to said tractor, means for moving a load of feed forward in said bin including transverse scrapers moving over the floor of said bin by laterally disposed chains running over sprockets on transverse feed chain shafts, feed mixers on transverse shafts operating in the forward part of said bin, and a transversely operating delivery belt at the front of said bin driven by a roller having a shaft provided with a sprocket, mechanism for transmitting rotary motion from the power take-off of said tractor and transmitting said motion to the shafts of said mixing and feed moving mechanisms consisting of a longitudinally extending main shaft operating in the central part of said frame above said under frame carrying said fifth wheel attached to the power take-off shaft of said tractor, a first bevel gear box laterally disposed in one side portion of the upper part of said under frame carrying said fifth wheel and having shafts longitudinally and transversely disposed relative to said frame, a second bevel gear box laterally disposed in the opposite side portion of the upper part of said under frame carrying said fifth wheel, said first gear box receiving rotary motion from said main shaft and transmitting said rotary motion in part to said transverse mixer shafts and in part to said second gear box; said second gear box transmitting rotary motion to said feed chain shafts, a speed reducing mechanism operating between said second gear box and said feed chain shafts, a sprocket on said main shaft adjacent the front of said frame, and a chain running over said sprocket and the sprocket on the shaft driving the roller driving said transverse delivery belt.

4. In a portable feed mixer and distributor, adapted to be drawn and operated by a tractor having a power take-off shaft, including a wheeled frame, a bin on said frame, an under frame carrying a fifth wheel having an upper part attached to the under side of said frame and a pivoting lower part provided with a draw bar extending forward of said frame and attached to said tractor, means for moving a load of feed forward in said bin including transverse scrapers moving over the floor of said bin by laterally disposed chains running over sprockets on transverse feed chain shafts, feed mixers on transverse shafts operating in the forward part of said bin, and a transversely operating delivery belt at the front of said bin driven by a roller having a shaft provided with a sprocket, mechanism for transmitting rotary motion from the power take-off of said tractor and transmitting said motion to the shafts of said mixing and feed moving mechanisms consisting of a longitudinally extending main shaft operating in the central part of said frame above said under frame attached to the power take-off shaft of said tractor, means within the upper part of said under frame for transmitting power by rotary motion from said central main shaft laterally to said feed mixers on one side of said bin, means within the upper part of said under frame transmitting power by rotary motion laterally in the opposite direction to said transverse feed chain shafts on the opposite side of said bin, and means ahead of the front of said bin transmitting rotary motion from said main shaft to said delivery belt shaft.

References Cited in the file of this patent
UNITED STATES PATENTS

| | | |
|---|---|---|
| 712,581 | Ceppenheim et al. | Nov. 4, 1902 |
| 779,714 | Kemp | Jan. 10, 1905 |
| 1,093,928 | Hogeman | Apr. 21, 1914 |
| 2,676,002 | Wolfe | Apr. 20, 1954 |